(12) United States Patent
Liokumovich et al.

(10) Patent No.: US 11,443,024 B2
(45) Date of Patent: Sep. 13, 2022

(54) AUTHENTICATION OF A CLIENT

(71) Applicants: TELEFONAKTIEBOLAGET LM ERICSSON (PUBL), Stockholm (SE); ERICSSON TELEKOMMUNIKATION GMBH, Frankfurt am Main (DE)

(72) Inventors: Gregory Liokumovich, Oberursel (DE); Natalie Kather, Frankfurt (DE); Bernhard Michler, Niedernberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 295 days.

(21) Appl. No.: 16/482,353

(22) PCT Filed: Feb. 22, 2017

(86) PCT No.: PCT/EP2017/054060
§ 371 (c)(1),
(2) Date: Jul. 31, 2019

(87) PCT Pub. No.: WO2018/153445
PCT Pub. Date: Aug. 30, 2018

(65) Prior Publication Data
US 2021/0136065 A1 May 6, 2021

(51) Int. Cl.
*G06F 21/34* (2013.01)
*H04W 12/069* (2021.01)
*H04L 9/40* (2022.01)

(52) U.S. Cl.
CPC .......... *G06F 21/34* (2013.01); *H04L 63/0853* (2013.01); *H04L 63/0876* (2013.01); *H04W 12/069* (2021.01)

(58) Field of Classification Search
CPC .......... G06F 21/34; G06F 21/43; G06F 21/35; H04L 63/0853; H04L 63/0876; H04L 63/08; H04W 12/069; H04W 4/40; H04W 4/70; Y04S 40/20
See application file for complete search history.

(56) References Cited

U.S. PATENT DOCUMENTS

| 7,373,515 | B2 | 5/2008 | Owen |
| 9,674,700 | B2 * | 6/2017 | John Archibald .... H04W 12/50 |
| 2007/0056022 | A1 * | 3/2007 | Dvir ........................ G06F 21/31 726/4 |

(Continued)

FOREIGN PATENT DOCUMENTS

| AU | 2016 277 629 A1 | 1/2017 |
| CN | 103988169 A | 8/2014 |

(Continued)

OTHER PUBLICATIONS

Communication pursuant to Article 94(3) EPC for European Application No. 17709377 dated Feb. 28, 2020, 5 Pages.

(Continued)

*Primary Examiner* — Khoi V Le
(74) *Attorney, Agent, or Firm* — Sage Patent Group

(57) ABSTRACT

A method, apparatus, and computer program for authenticating a client is disclosed. The method comprises determining a device to be used for the authentication of the client, receiving a parameter value of the device and an authentication value of the client, and authenticating the client based on the authentication value and the parameter value.

26 Claims, 9 Drawing Sheets

(56) References Cited

U.S. PATENT DOCUMENTS

| | | |
|---|---|---|
| 2010/0235900 A1 | 9/2010 | Robinton et al. |
| 2011/0321146 A1 | 12/2011 | Vernon et al. |
| 2013/0081101 A1 | 3/2013 | Baer et al. |
| 2013/0345896 A1 | 12/2013 | Blumer et al. |
| 2014/0165175 A1* | 6/2014 | Sugiyama ............ G06F 21/552 726/8 |
| 2015/0188891 A1* | 7/2015 | Grange ............... H04L 63/0428 380/270 |
| 2016/0070901 A1 | 3/2016 | Kim |
| 2016/0191473 A1 | 6/2016 | De Wasch |
| 2016/0224983 A1* | 8/2016 | Cash ................... G06Q 20/385 |
| 2017/0026369 A1* | 1/2017 | Hao .................... H04L 63/0876 |

FOREIGN PATENT DOCUMENTS

| | | |
|---|---|---|
| CN | 105554043 A | 5/2016 |
| KR | 101 330 113 B1 | 11/2013 |
| WO | WO 2007/015253 A2 | 2/2007 |
| WO | WO 2011/149543 A1 | 12/2011 |
| WO | WO 2015/174970 A1 | 11/2015 |

OTHER PUBLICATIONS

International Search Report and Written Opinion of the International Searching Authority, PCT/EP2017/054060, dated May 9, 2017, 14 pages.

Wikipedia, "Multi-factor authentication", Retrieved from https://en.wikipedia.org/wiki/Multi-factor_authentication on Mar. 1, 2017, 7 Pages.

Chinese Office Action for Chinese Patent Application 201780087022.8, dated Jul. 15, 2021, 6 pages.

Office Action dated Jan. 20, 2022 for Chinese Patent Application No. 201780087022.8, 8 pages.

Notice of Allowance dated Apr. 24, 2022 for Chinese Patent Application No. 201780087022.8, 4 pages.

* cited by examiner

AUTHENTICATION OF A CLIENT

This application is a 35 U.S.C. § 371 national stage application of PCT International Application No. PCT/EP2017/054060 filed on Feb. 22, 2017, the disclosure and content of which is incorporated by reference herein in its entirety.

TECHNICAL FIELD

Various embodiments relate to methods, devices and computer program products for authenticating a client.

BACKGROUND

The importance to authenticate a client (or a user) is constantly increasing within a world where everything gets more and more connected and electronically controlled.

The most common authentication method today is that a user authenticates himself by a secret code (for example a Personal Identification Number (PIN) code or a password).

Situations can occur where the user enters a wrong secret code several times (for example if the user has forgotten the secret code or mixes it with another secret code, which may easily happen the more secret codes a user must remember). In such a case the user is usually blocked after a certain number of attempts.

If the user utilizes a fingerprint sensor for authentication, an authentication may not be possible anymore if the user has injured the finger (for example cut the skin) to be used for authentication.

Known other authentication methods, which could be used as back authentication methods for situations where the user has forgotten the secret code or where the user may not be able to use the primary authentication method, are for example:
a) The user shall answer to "secure questions" like for example birth name of the mother or what is his favorite color.
b) A software token is required (for example a "secret" sent per Short Message Service (SMS) to the user or generated by a mobile application).
c) A secret generated by a hardware token device is required.

However, those methods have disadvantages. Static "secure questions" are rather insecure and answers can be easy guessed or investigated. Additionally, the user must set-up these questions upfront. A software token relies on a portable device, for example on a smart phone which can be lost, stolen, or run out of battery. Moreover, a mobile device is an obvious target for a potential attacker. A hardware token is a more secure solution, however it requires specialized hardware which can be broken, got lost or forgotten (especially when it is not used daily). Further a hardware token usually comprises a battery and therefore requires regular maintenance (for example exchange of battery or exchange of the hardware token).

SUMMARY

A need for an alternative authentication method exists which alleviates those disadvantages.

This need is met by the features of the independent claims, where a client may be the user. The dependent claims define refinements and further embodiments of the independent claims.

According to one aspect a method for authenticating a client is provided. The method comprising determining a device to be used for authentication of the client and receiving a parameter value of the device. The method further comprises receiving an authentication value of the client and authenticating the client based on the authentication value and the parameter value.

According to another aspect an apparatus for authenticating a client is provided. The apparatus is adapted to perform determining a device to be used for authentication of the client and receiving a parameter value of the device. The apparatus is further adapted to perform receiving an authentication value of the client and authenticating the client based on the authentication value and the parameter value.

According to another aspect an apparatus for authenticating a client is provided. The apparatus comprises a first module configured to determine a device to be used for authentication of the client and a second module configured to receive a parameter value of the device. The apparatus is further comprising a third module to receive an authentication value of the client and a fourth module to authenticate the client based on the authentication value and the parameter value. The second and the third module may be combined into one module.

According to a further aspect an apparatus for authenticating a client is provided. The apparatus comprises at least one processor. The apparatus further comprises a memory, the memory containing a program comprising instructions executable by the at least one processor. The at least one processor is configured to determine a device to be used for authentication of the client and to receive a parameter value of the device. The at least one processor is further configured to receive an authentication value of the client and to authenticate the client based on the authentication value and the parameter value.

According to another aspect a computer program is provided. The computer program comprises program code to be executed by at least one processor of an apparatus, wherein the execution of the program code causes the at least one processor to execute a method for controlling a client. The method comprises determining a device to be used for authentication of the client and receiving a parameter value of the device. The method further comprises receiving an authentication value of the client and authenticating the client based on the authentication value and the parameter value.

The device can be a device where the client can access (for example read) the parameter value from (for example a vehicle where the parameter value may be an odometer value).

It is to be understood that the features mentioned above, and the features yet to be explained below, can be used not only in the combinations indicated, but also in other combinations or in isolation, without departing from the scope of the present invention. Features of the above-mentioned aspects and embodiments may be combined with each other in other embodiments.

The above described methods, apparatuses and computer programs offer the advantage that parameter(s) of available connected device(s), where the client has access to, can be used as native token source(s) for the authentication of the client. No special software or hardware/special device(s) for token generation are needed which is more user friendly. The increasing number of connected devices extends the device base which can be used as token source for authentication.

In an embodiment several of those connected devices can be configured to be used as potential token sources. This enables a large existing base of devices to be used for authentication and eliminates potential problems if some of the devices may not be available (for example if devices got lost, stolen, broken, are not reachable or ran out of battery). If a single connected device supports multiple parameters as token source(s) and/or if multiple devices are supported as token source, the parameter value(s) and/or the device(s) to be used as token source(s) can be changed with every authentication attempt which further increases the security of the authentication process. Further variable parameters may be used for authentication, which makes guessing of the parameter values almost impossible and increases the security of the authentication process.

Since access to connected devices is often secured by separate means, a non-authorized person cannot easily access a connected device used as a token source.

Further it is possible to avoid potential targets for hackers as token source (for example smart phones). Instead less popular targets for hackers can be used as token source(s). However, if the risk to use smart phones as token source is acceptable, the described method for authentication can be still used with one or more parameter value originated from a smart phone.

BRIEF DESCRIPTION OF THE DRAWINGS

The foregoing and additional features and effects of the invention will become apparent from the following detailed description when read in conjunction with the accompanying drawings showing example embodiments. The elements and steps shown in the figures are illustrating various embodiments and show also optional elements and steps.

FIG. 2a illustrates an example embodiment of a message flow diagram with respect to the example embodiment shown in FIG. 1a.

DETAILED DESCRIPTION

Figure 1A:
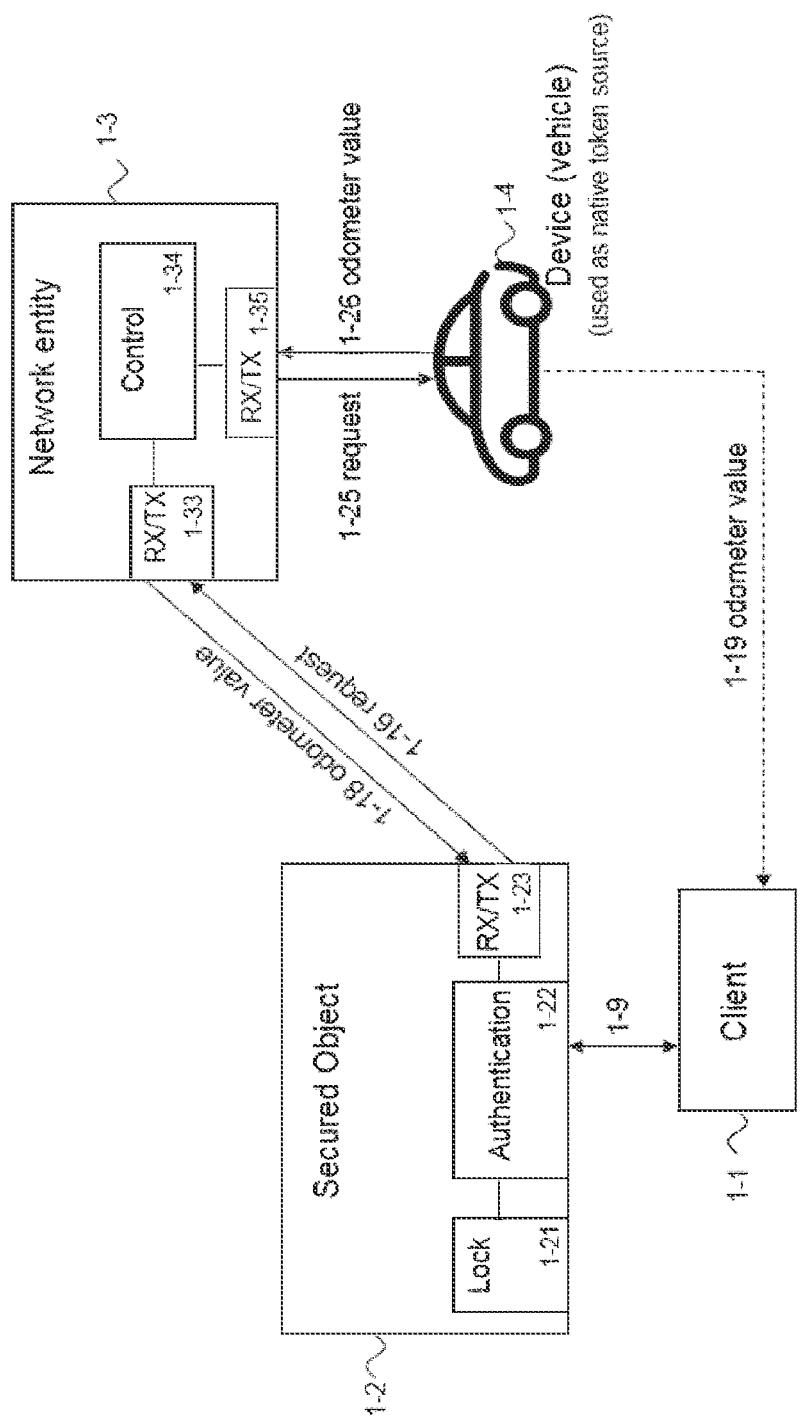
FIG. 1a shows an example embodiment comprising a vehicle used as token source where the authentication is performed in a secured object.

In the following description, for purposes of explanation and not limitation, details are set forth, such as for example embodiments with respect to one or more devices and a one or more device parameters that can be used as token source, to provide a thorough understanding of the invention. It will be apparent to one skilled in the art that the invention may be practiced in other embodiments that depart from these details. For example, the skilled person in the art will appreciate that the invention may be practised with any device that can provide a parameter value which can be used in the authentication process of a client. The same applies to the device or apparatus where the authentication is performed, which may be for example a secured object, a server, or any network entity.

Embodiments will be described in detail with reference to the accompanying drawings. The scope of the invention is not intended to be limited by the embodiments described hereinafter or by the drawings, which are taken to be illustrative only. Elements or steps shown in the drawings may be optional and/or their order may be exchangeable.

The drawings are to be regarded as being example schematic representations. Flow diagrams and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings, or described herein, may also be implemented by an indirect connection or coupling. A coupling between components may also be established over any fixed or wireless connection. Functional blocks may be implemented in hardware (HW), firmware, software (SW), or a combination thereof. The drawings do not necessarily illustrate all elements and functional blocks of the shown devices. Especially elements/blocks which are not used or needed in the following description may not be shown, even if they may be an integral part of the devices. The drawings and the description concentrates on the elements and functional blocks which are used to described the claimed subject matter.

The following detailed example embodiments are described with respect to use cases where an authentication of a client is done. However, this shall be not interpreted as limiting. The described methods, entities/devices/objects, or client(s) can be used in any scenario where an authentication of a client shall be done. For example, an authentication of a client may be done when the client wants to access his home via a smart home server, when the client wants to access a locked or secured object or when the client wants to access a secured server. Further use cases may be to access a bank account (for example to do an emergency money transfer when being abroad and when cards are stolen or lost), access to a building (for example office, garage, somebody's home where one does some work, or open a box containing a key—for example for a room in hotel), or to access web services (like for example e-mails).

A client may be a user or person who wants to get access to a secured object or information by authenticating himself. However, a client could be also a client device which is used by the user or person to perform the authentication process. Such a device can be any mobile device (for example a smart phone, a Personal Digital Assistant (PDA), a laptop, or a tablet) or a fixed installed device which the user uses to perform the authentication (for example a fixed installed display/touch screen and or a fixed installed key pad).

A token is a secret key to be used for the authentication of a client. A token may be a parameter value of a connected device where the client has access to. A parameter value of a device used as token, which was initially not intend for this purpose, is can be called a "native" token.

A secured object may be any object which requires authentication to get access to or to get access to its content. For example, a secured object may be the home of a user secured with a lock, a room or door secured with a lock, a safe or any other object securing information or tangible assets, a web site or a server, or anything where access is prohibited for clients/users who are not authorized and/or cannot be authenticated.

A network entity may be a server or network element which can perform the authentication or be involved in the authentication process. The network entity may be a server, for example a server which has access to a device providing a parameter value to be used as token in the authentication process. The network entity may communicate with the device and another entity/a secured object via a connection which is preferably secured (for example an encrypted connection between the two entities/devices which trust each other).

A device to be used for the authentication (for example providing a parameter value to be used as token in the authentication process) may be a fixed or mobile device which is connected to a network or to an entity/secured object. For example, a smart meter installed in a house, a vehicle (for example a car or motorbike) or a mobile device of a user (for example a smart phone, a smart watch, digital headphones, or a camera). User/client access to the device may be secured by a special means (for example a PIN code or a key, like for example a car key).

An authentication type may relate to the type of device and/or the parameter value (the token) to be used for the authentication. The authentication type may be "authentication via vehicle", "authentication via smart meter", "authentication via smart device" or "authentication via wearable device. The authentication type may relate to a group of devices (for example vehicles) or to a dedicated device (for example vehicle with a special license plate or a special vehicle ident number). In addition, the authentication type may also comprise one or more parameters usable as token for the authentication, for example in the case of the authentication type "authentication via vehicle" the type may also comprise the parameter to be used (odometer value, fuel level, miles to next inspection, . . . ).

A parameter value of the device can be any parameter associated with the device, for example a smart meter value, a vehicle odometer value, a vehicle fuel level indicator, the kilometres a vehicle can still drive with the remaining gas, the number of steps walked today so far (for example counted by a smart watch or a wearable smart device), the last called number from a mobile phone, the traffic volume used by a mobile phone during a past period, battery level of mobile devices, current volume level of headphones, or the number of pictures stored in the memory of a camera. The parameter value may be a fixed or a variable value of the device, however a variable value is preferred since it is more secure due to its changing nature (for example a spied out variable parameter value is outdated after some time).

A transceiver is an element for communicating with another device or entity. The transceiver may comprise separate or combined receiver (RX) and transmitter (TX) components.

Today, many devices that are in daily use and/or are accessible by a person have network access and are connected (for example to a server in the internet, to a local server or to other connected devices). In the future the amount of connected devices is expected to increase with the introduction of the Internet of Things (IoT) and Machine Type Communication (MTC). Those devices comprise usually parameters which are often variable parameters. Access to those devices is often limited to a certain person/user of a certain group, unauthorized access is prohibited. It is proposed to use one or more of those parameter values of one or more connected devices as a "secret code" (a "native" token) source for authentication purposes.

This enables the usage of alternative ways to authenticate a client (for example a user) by utilizing already existing device and infrastructure (connections to those devices). It is not relied on mobile devices (for example smartphones), however the usage of mobile devices is not restricted.

FIG. 1a shows an example embodiment of the proposed solution. A client 1-1 (for example a user) wants to get access to a secured object 1-2. The secured object may be for example the house of the client, a safe, or any other object that may be locked. Alternatively, the secured object can be also an application running on a device or a sever or a web page where the client seeks access to (for example on line banking or shopping applications or web pages). The secured object 1-2 may comprise a lock 1-21, an authentication function 1-22 and a transceiver 1-23. If the client 1-1 is successfully authenticated the lock 1-21 may be opened offering access to the secured object or information. The authentication function 1-22 may be part of the secured object or located on a separate device connected to the secured object (not shown, for example a server or a device controlling access to the secured object).

In the following description of the example shown in FIG. 1a the secured object is assumed to be the house of the client where the client seeks access to. The house may comprise a smart server controlling the access to the house, where the authentication functionality may be part of the smart server.

The client 1-1 may try to get access to the house by entering 1-9 a PIN code to for example a keypad or touch screen (not shown) at the entrance door. Alternatively, the client may connect with a mobile device to the smart home and provide the PIN via the mobile device. If the client entered or provided the wrong PIN code for a few times (for example 3 times), the smart home may block this way of authentication and may ask for an alternative type of authentication, which may have been pre-configured by the client beforehand. The client may configure (and/or enable) one or more alternative authentication types (for example authentication methods) beforehand. If several alternative authentication types are possible (or pre/configured), the client may be asked for the alternative authentication type he wants to use. The authentication function 1-22 may verify if the authentication type selected by the client is supported (or allowed). In a variation of the described embodiment, the client may be asked as a first step about the authentication type to be used, even before he starts the first authentication attempt. In another variation the authentication function 1-22 may select the authentication type to be used and inform the client 1-1 about it.

In the present example the authentication type to be used (or the one selected by the client or the authentication function) is "authentication via vehicle" (for example the vehicle 1-4 of the client), where the odometer value of the vehicle may be used as the secret code (the token). The odometer value of vehicle 1-4 is received (1-18) by the authentication function 1-22 of the secured object 1-2 from a network entity 1-3 which has access to the vehicle 1-4.

The client has access to the vehicle to obtain (1-19) (for example read) the odometer value from the vehicle and provides (1-9) it as authentication value to the authentication function 1-22. The authentication function performs the authentication based on the authentication value provided by the client 1-1 (for example the read odometer) and the parameter (odometer) value received via network entity 1-3, and if the authentication is successful unlocks lock 1-21 or allows access to the requested object and/or information.

Network entity 1-3 can connect to the vehicle 1-4, preferably via a secure connection which is encrypted. The network entity 1-3 may be for example a network entity of the vehicle manufacturer which has (or is able) to access parameters of the vehicle 1-4. The network entity 1-3 may comprise one or more transceivers (1-33, 1-35) and a control function 1-34 which controls the access to the vehicle 1-4. Network entity 1-3 may request (1-25) the odometer value from the vehicle 1-4, and the vehicle may return (1-26) the odometer value as response to the request. Alternatively, the vehicle 1-4 may report the odometer value periodically (for example every hour) to the network entity 1-3, so that a dedicated request (1-25) is not needed.

The authentication function 1-22 of the secured object 1-2 can connect to the network entity 1-3. The connection is preferably a secure connection which is encrypted. The odometer value of vehicle 1-4 may be requested (1-16) from the network entity 1-3. In response to the request the network entity 1-3 may provide (1-18) the odometer value. Alternatively, the network entity 1-3 may report (1-18) the odometer value of the vehicle periodically (for example every hour) to the secured object 1-2 without any dedicated request 1-16.

If the odometer value is reported (1-26, 1-18) periodically by the vehicle 1-4 and/or the network entity 1-3, it may not match with the odometer value obtained (1-19) by the client from vehicle 1-4, since the time when the odometer value is reported (1-26, 1-18) and when it is obtained (1-19) may not be the same. Therefore, the authentication function 1-22 may apply different criteria for authenticating the client depending on the expected accuracy of these values. For example, the authentication function 1-22 may either check for an exact match or if the provided values are within a defined range to authenticate the client 1-1. Alternatively, the authentication function 1-22 may ignore a defined amount of the least significant digits or bits when authenticating the client to address an expected in-accuracy.

In a further refinement of the described embodiments a parameter may be chosen as secret code (token) which is not normally displayed or provided by a device (for example if the device is a vehicle date or the odometer value when the last maintenance was performed might be used as token for the authentication). Access to this information by the client 1-1 may be enabled by the network entity 1-3.

Figure 1B:
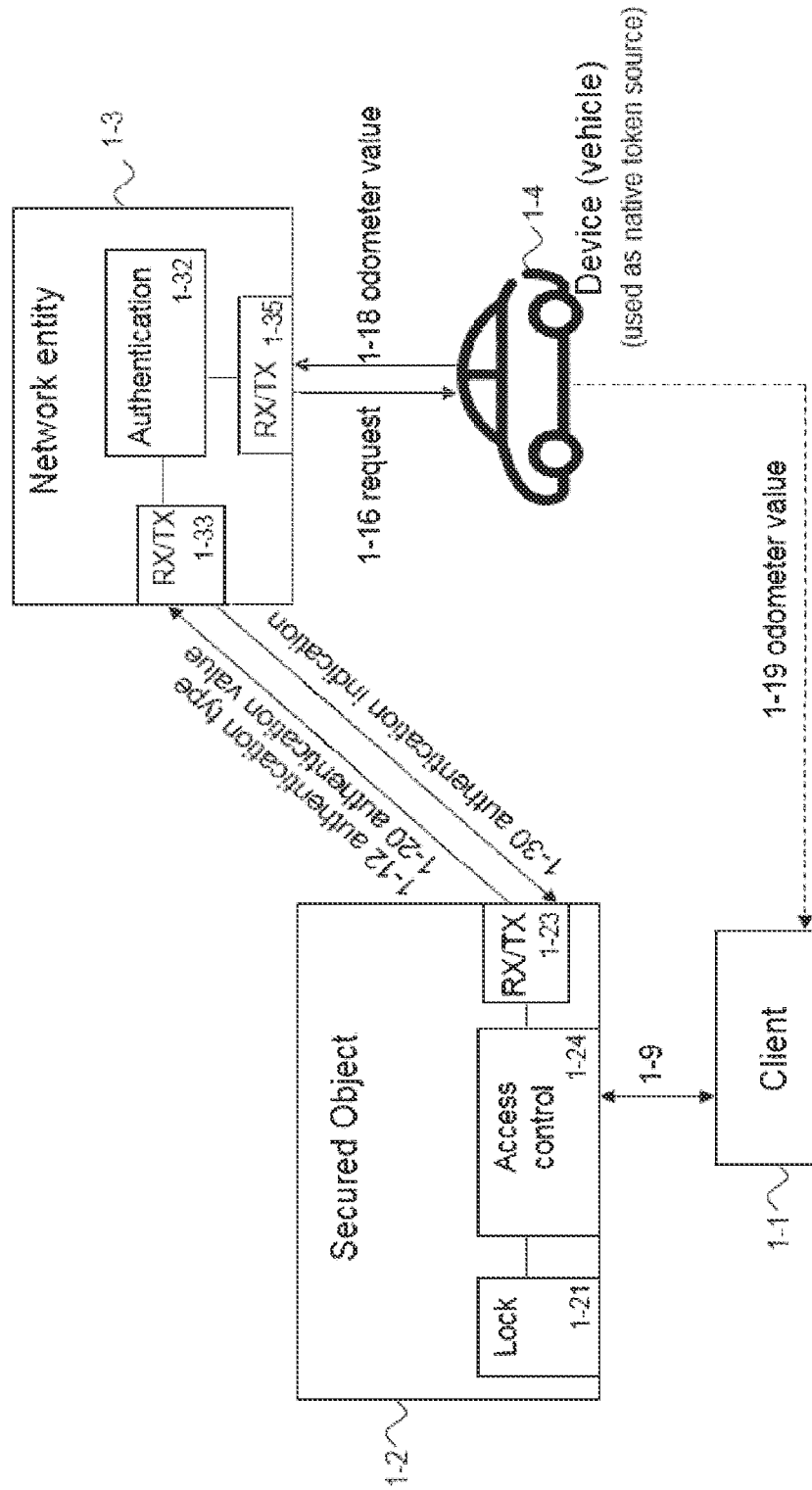
FIG. 1b shows another example embodiment comprising a vehicle used as token source where the authentication is performed in a network entity.

FIG. 1b illustrates a variation of the example embodiment shown in FIG. 1a. The main difference compared to FIG. 1a is the location of the authentication function 1-32, which is in FIG. 1a located in the secured object 1-2 and in FIG. 1b in the network entity 1-3.

The scenario shown in FIG. 1b may apply to situations where for example the vehicle manufacturer, which owns the network entity 1-3, does not allow access to parameter values of vehicle 1-4 (for example the odometer value). In such a case the authentication based on a parameter value of the vehicle (here the odometer value) may happen inside the domain of the vehicle manufacturer, for example in the network entity 1-3 of the manufacturer.

The description of the elements and steps with similar reference signs as in FIG. 1a apply also to FIG. 1b. The client 1-1 provides the authentication value (the odometer value obtained (1-19) from the vehicle) via an access control function 1-24 (which may comprise a keypad or a touchscreen for entering the authentication value and optionally the authentication type) to the secured object 1-2. The authentication value is then forwarded (1-20), optionally together with the authentication type (1-12), to the network entity 1-3 housing the authentication function 1-32. The authentication type may be needed if the client owns for example several vehicles that are enabled for authentication or if several different vehicle parameters could be used as "secret code" (token) in the authentication process. The authentication is then performed by the authentication function 1-32 of the network entity 1-3, based on the parameter value obtained (1-18) from vehicle 1-4 and the authentication value (1-20) and optionally the authentication type (1-12) provided by the secured object 1-2/the client 1-1 (the authentication is done in a comparable way as described for FIG. 1a above). The network entity 1-3 then returns (1-30) the result of the authentication process (successful/not successful) to the secured object 1-2 which then enables access to the requested information or object via the access control function 1-24 that coordinates and controls the access to the secured object 1-2.

Figure 1C:
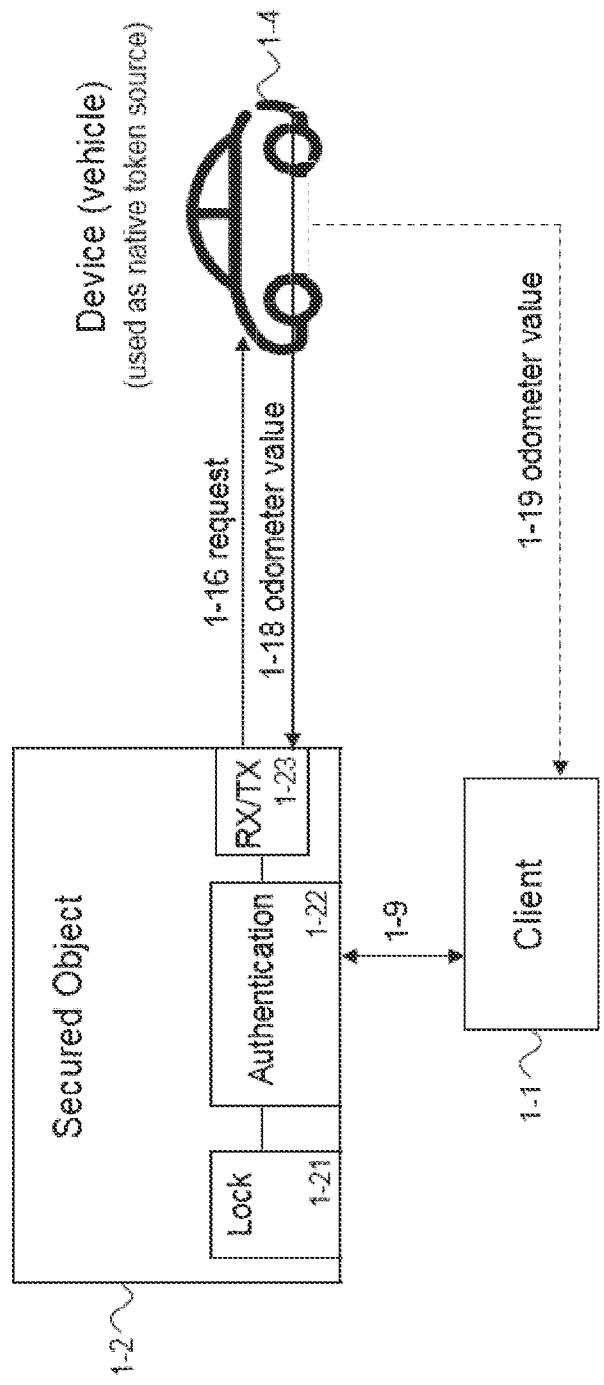
FIG. 1c shows another example embodiment comprising a vehicle used a token source where the authentication is performed in a secured object communicating directly with the vehicle.

FIG. 1c shows another variation of the example embodiment shown in FIG. 1a. The main difference compared to FIG. 1a is that the secured object 1-2 can directly communicate with the device (vehicle) 1-4 and thus the network entity 1-3 of FIG. 1a is not involved in the authentication process anymore. The connection between the secured object 1-2 and the vehicle 1-4 may be accomplished via a fixed, a Bluetooth, a Wireless Local Area Network (WLAN), a cellular or a Machine to Machine connection. The connection maybe a direct connection or may involve several intermediate (network) elements, for example in the case of a cellular connection. The connection between the secured object 1-2 and the vehicle 1-4 is preferably a secured and/or encrypted connection and may be established only on request (for example triggered by the authentication function 1-22 if the client 1-1 selects as authentication type an authentication via a parameter (here odometer) value of vehicle 1-4.

Like described with respect to FIG. 1a the vehicle 1-4 may provide (1-18) the parameter value (here the odometer value) either on request or periodically (if enabled and if a connection with the authentication function 1-22 in the secured object 1-2 can be established).

Using a vehicle as device (as described in FIGS. 1a to 1c) as "secret code" (token) source offers the advantage of introducing another security level, since the vehicle can be only accessed by the person who possesses the vehicle key. The same may apply also to other devices used as a "secret code" source, for example to a smart meter located in a locked house/location or to a portable device (for example a smart phone or a smart watch) secured by a screen lock code.

The described solution in connections with the examples shown in FIGS. 1a to 1c is not limited to the usage of a vehicle as the source of the "secret code" (token) and the odometer value of the vehicle as the "secret code" (token). Any device that can be access by the client and by the authentication function (either via a network entity 1-3 or directly), and which can provide a parameter value directly to the authentication function which can be also obtained by the client 1-1, may be used. Other examples of such a device may be a smart meter (where the secret code might be the meter value) or a mobile device like for example a smart watch (where the secret code might be a monitored client parameter like for example the number of steps done today) or a mobile phone (where the secret code might be the last called number, the number of minutes of the incoming/outgoing calls this day/week/month, etc. . . . ).

Figure 2A:
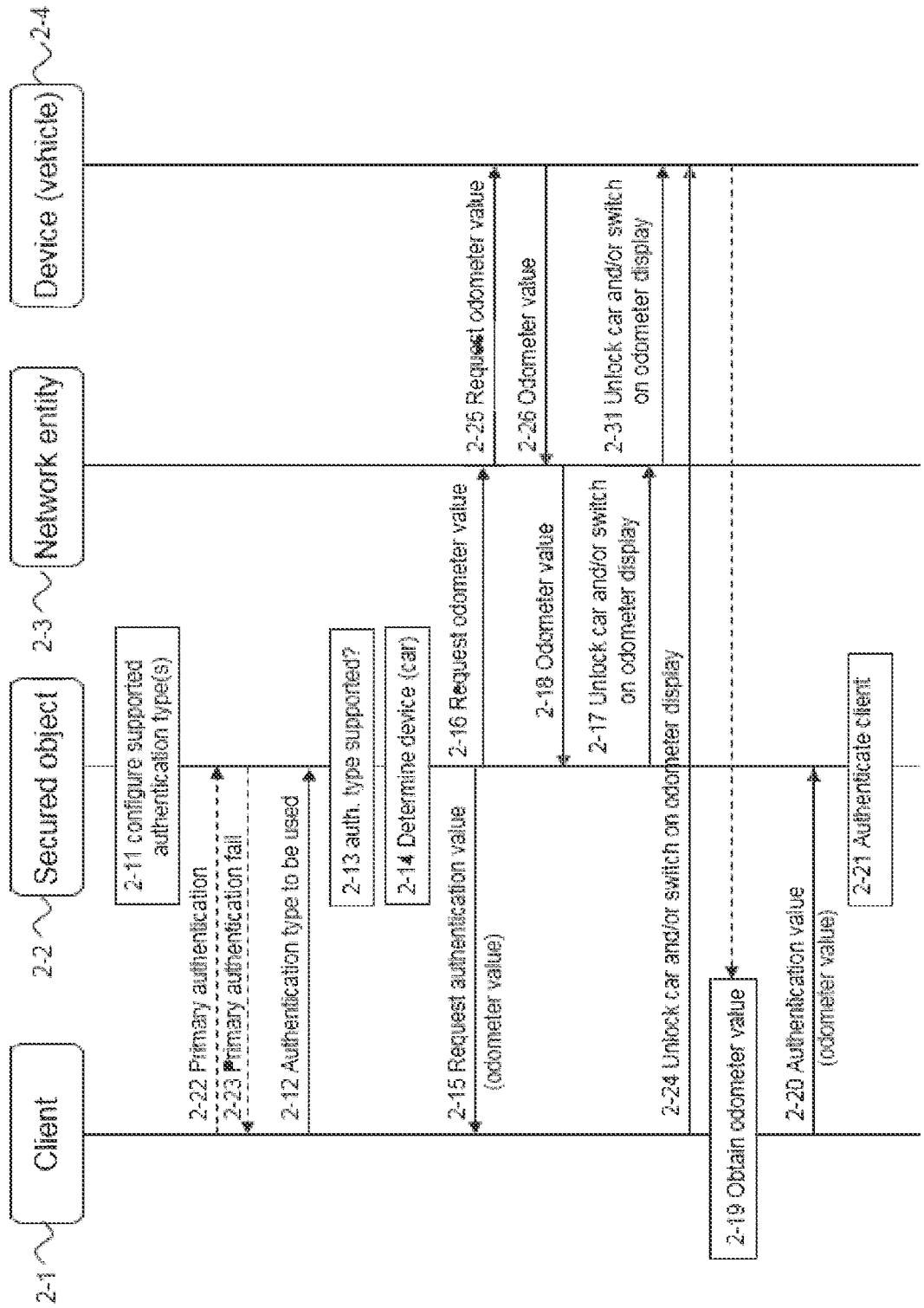

FIG. 2a illustrates an example embodiment of a message flow diagram related to FIG. 1a, where the authentication of the client 2-1 is performed by the secured object 2-2, and where the parameter value of the device 2-4 to be used as "secret code" (token) is provided via a network entity 2-3.

In optional step 2-11 the supported authentication types may be configured in the secured object 2-2 housing the authentication function. The configuration may be done in advance, for example by the client (not shown). Supported authentication types may be for example "authentication via vehicle", "authentication via smart meter" or "authentication via smart device". The authentication type may comprise an identification of the device to be used. For example, if the client possesses several "smart devices" a simple indication of an "authentication via smart device" might not be enough. Therefore, the smart device to be used, and optionally the parameter to be used, may be defined as part of a configured authentication type.

Optional step 2-22 illustrates a primary authentication attempts of the client 2-1. If the primary authentication attempt fails (optional step 2-23) the client may start an alternative (for example backup) authentication process in step 2-12. The primary authentication maybe be the default authentication type (for example authentication via PIN). Alternatively, there may be no default authentication type at all and the client may start the authentication process directly with step 2-12 or by providing the authentication value (in this case steps 2-19 and 2-20 happen earlier, for example at the place of step 2-12).

In step 2-12 the client 2-1 may indicate the authentication type to be used to the authentication function in the secured object 2-2. If there is only one authentication type supported, the client can omit this step. The "authentication type to be used" indication may comprise information about the device 2-4 to be used for the authentication. For example if there are several devices in the same general category of the authentication type (for example 2 or more vehicles in the "authentication via vehicle" type), the authentication may comprise further information to identify the device (for example a vehicle identification like for example the licensing plate of a car or motorbike). If there are several parameters of the device 2-4 supported for authentication, the authentication type may further comprise information about the parameter to be used for the authentication process.

In step 2-13 the secured object 2-2 may check if the authentication type indicated by the client 2-1 is supported. The check may comprise checking if the identified device for the authentication and/or the identified parameter are supported or not. If the "authentication type to be used" (or the indicated device or parameter) is not supported the secured object 2-2 may indicate this to the client 2-1, for example via displaying a message to the client (for example an error message, not shown) and terminate the authentication attempts. Step 2-13 is optional and may not be done if only one authentication type is supported or if step 2-12 is omitted. In a variation the secured object may select the authentication type to be used from the supported authentication type(s) by itself and informs then the client about the selected authentication type, for example by requesting the authentication value in step 2-15 (described below).

In step 2-14 the device, and optional also the parameter to be used for the authentication process, is determined by the secret object 2-2. The determination may be done based on the authentication type information received in step 2-12, may be done based on a configured device and optionally configured parameter information in the secured object (for example if only one authentication type is supported or if a default authentication type/parameter shall be used), or may be done based on a selected authentication type by the secured object 2-2. In the example shown in FIG. 2a vehicle 2-4 is determined as the device and the odometer value is determined as the parameter to be used.

In optional step 2-15 the secured object 2-2 indicates to the client 2-1 which value is requested as authentication value from the client. The indication is optional since the client may be already aware of the authentication value to be used, for example based on the authentication type which he may have indicated in step 2-12 to the secured object or if only one authentication type or device or parameter is supported. The request 2-15 may comprise information about the device and/or the parameter determined in step 2-14. Request 2-15 may be also send at a different time point (for example between step 2-16 and 2-19).

In step 2-16 the secured object 2-2 may request the value of the parameter of device to be used for the authentication process from the network entity 2-3. Request 2-16 may comprise an identification of the device 2-4 and/or an information about the parameter to be used for the authentication process. Step 2-16 is optional since in an alternative implementation network entity 2-3 may report the value of the parameter to be used for the authentication process to the secured entity 2-2 on its own motion (for example periodically every hour), for example if the secured entity may have earlier subscribed to the periodical reporting of the parameter value at network entity 2-3 (not shown). If several parameters are supported by a device, security can be increased by changing the parameter to be used with every authentication attempt.

In optional step 2-25 the network entity 2-3 request the value of the parameter from the device 2-4. Request 2-25 may comprise an identification of the parameter to be used for the authentication process. Like step 2-16 step 2-25 is optional since in an alternative implementation the device 2-4 may report the value of the parameter to the network entity 2-3 on its own motion (for example periodically every hour), for example if the network entity may have earlier subscribed to the periodical reporting of the parameter value at the device 2-4 (not shown).

In step 2-26 device 2-4 provides the parameter value to network entity 2-3 which then provides the parameter value in step 2-18 to the secured object 2-2. As described above steps 2-26 and/or 2-18 may be done based on a request or on the own motion of the device (for example at fixed time points or periods).

Optionally secured entity 2-2 may enable access to the parameter value of the device in step 2-17 by indicating this to network entity 2-3. Network entity 2-3 may forward in step 2-31 the indication to the device 2-4. Enabling may be for example unlocking a security mechanism to allow access to the device (for example unlocking a vehicle) and/or enabling access to the parameter value (for example by switching a display on and/or displaying the requested information which may be usually not displayed). The parameter may be any parameter of the device which is not known or visible from the outside of the device. Preferably the parameter is a variable parameter (for example the odometer value of a vehicle). The parameter value may be also a value which is normally not accessible from the device, but which can be accessed by a special procedure or when access is enabled (for example by the client 2-1 or the network entity 2-3).

Steps 2-16 and 2-17, as well as steps 2-25 and 2-31, may be combined to one step/message (not shown). For example, a trigger for step 2-31 may be received from the secured object 2-2 as part of the request 2-16.

As an alternative (or in addition) to steps 2-16/2-17 the client 2-1 may also enable access to the parameter value of the device 2-4 in optional step 2-24 (for example by unlocking the vehicle with a key) and/or enabling access to the parameter value.

The client 2-1 accesses the device 2-4 and obtains in step 2-19 the parameter value from the device 2-4 (for example client 2-1 reads the odometer value from the display of the vehicle or connects his smart phone to the vehicle which retrieves the parameter value from the vehicle, for example via WLAN or Bluetooth which may have been enabled beforehand, for example by the network entity 2-3). Preferably the device used for reading and displaying the parameter value is a secured object and a secured connection is used for the transfer.

Client 2-1 provides in step 2-20 the parameter value obtained in step 2-19 as authentication value to the secured object 2-2. This may be done by entering the authentication value via a key pad or touchscreen, or by providing the authentication value by any other means (for example wirelessly via a mobile device) to the secured object 2-2.

Finally, the secured object 2-2 performs in step 2-21 the authentication of the client 2-1 based on the authentication value provided by the client in step 2-20 and the parameter value (in the example the odometer value) provided in step 2-18 from the network entity 2-3. The authentication may be successful if the authentication and the parameter values are identical, or if a possible deviation is inside a defined range (which may be needed for varying parameters if the reporting of the parameter does happen at fixed time points or periodically and not on request, or if the reporting happens on request and if the parameter value constantly change). The range, which may be for example a fixed range or may be defined by omitting some of the least significant bits of the parameter value and the authentication value in the authentication process, may be pre-configured (not shown) in the secured object 2-2 or may be received from the network entity 2-3 or from the device 2-4 via the network entity 2-3, for example together with the parameter (here odometer) value or beforehand.

The parameter value may comprise a time stamp and/or validity period stamp which may be used in the authentication process performed in the secured object 2-2 (for example the time stamp may be used to calculate the range or bits/digits to be used, for example by taking the difference of the current time and the time when the odometer value was provided by the device 2-4 into account when calculating the range).

If the authentication is successful, the secured object 2-2 may grant the client access to the requested information or object (for example unlock the door of the house). If the authentication is not successful, the secured object 2-2 will prohibit the access and may inform the client that the entered authentication information is not accepted. In an optional step (not shown) the secured object 2-2 may start another authentication trial by for example informing the client to repeat the authentication process by using the same or an alternative authentication type.

Figure 2B:
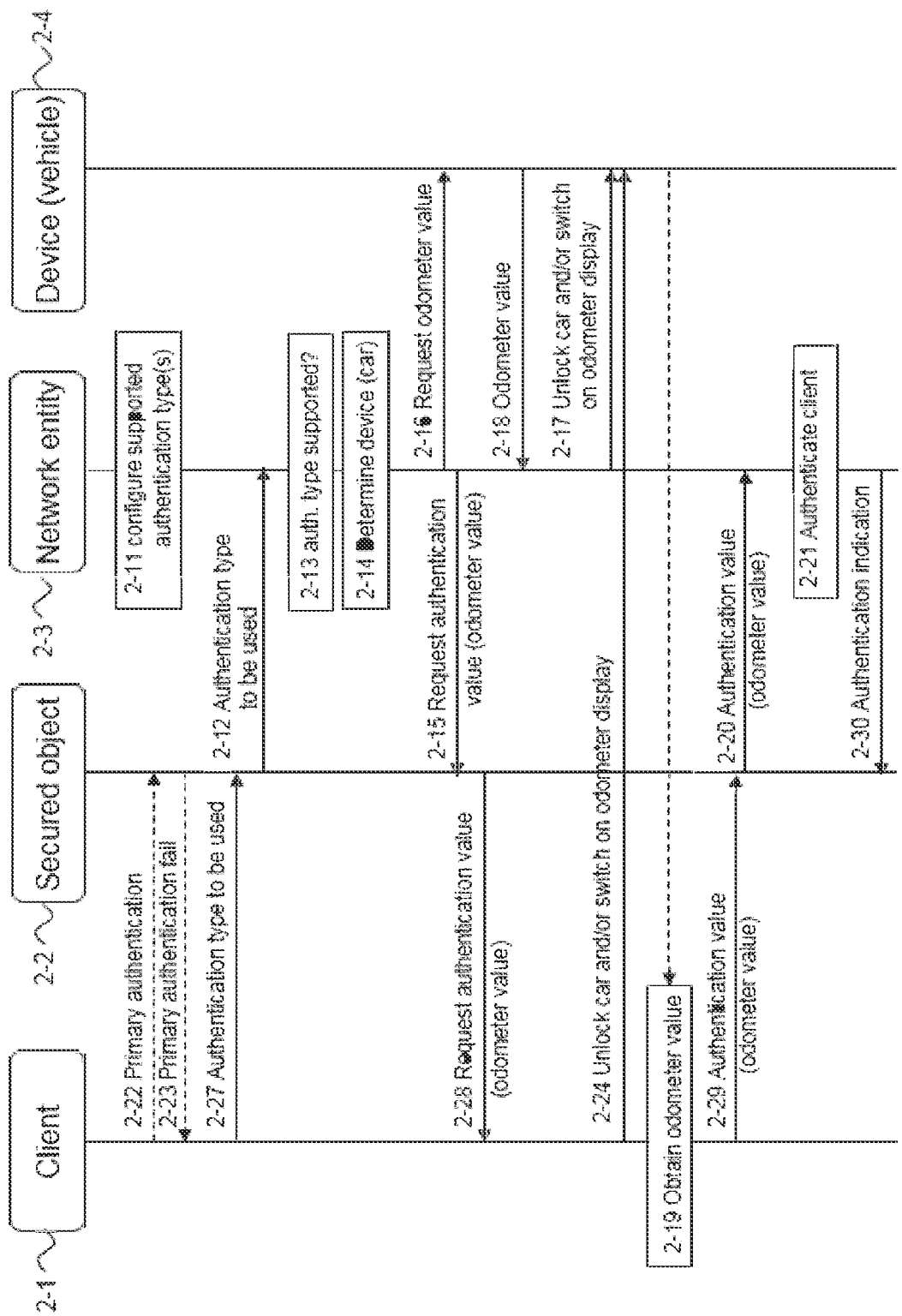
FIG. 2b illustrates an example embodiment of a message flow diagram with respect to the example embodiment shown in FIG. 1b.

FIG. 2b shows another example embodiment of a message flow diagram, this time related to FIG. 1b. The main difference compared to FIG. 2a is the location where the authentication of the client 2-1 is performed. In FIG. 2a the secured object 2-2 performs the authentication, while in FIG. 2b the network entity 2-3 performs the authentication. Thus mainly steps directly related to location of the authentication function differ and/or are added/removed, or moved to a different entity compared to the steps shown in FIG. 2a. Other steps, like for example steps 2-22, 2-23, 2-24, and 2-19 are similar compared the corresponding steps of FIG. 2a and are therefore not described in detail with respect to FIG. 2b anymore.

In optional step 2-11 the supported authentication type(s) may be configured in network entity 2-3 housing the authentication function. This step is comparable to step 2-11 shown in FIG. 2a, however the place where it may be performed has been moved from the secured object 2-2 to the network entity 2-3.

Since the secured object 2-2 does not house the authentication function in FIG. 2b anymore, the secured object may forward the optionally received (2-27) authentication type to be used in step 2-12 to the network entity 2-3. Step 2-12 is optional and may be only done if step 2-27 is done as well. Similar considerations as mentioned with respect to FIG. 2a for the authentication type apply also here.

Like in FIG. 2a the supported authentication type may be checked in step 2-13 and the device, and optional also the parameter, to be used for the authentication process, is determined in step 2-14. However, in FIG. 2b step 2-13 may be, and step 2-14 is, performed by the network entity 2-3 since the authentication function is located there.

In step 2-15 the network entity 2-3 may request the authentication value from the secured object 2-2, which may forward 2-28 the request to the client 2-1. Similar consideration as for the request 2-15 of FIG. 2a above apply also to the optional steps 2-15 and 2-28 of FIG. 1b.

Because the authentication function is part of the network entity 2-3, the network entity may request the parameter (odometer) value in step 2-16 from the device 2-4. Otherwise optional step 2-16 is comparable to step 2-16 as shown and described in relation to FIG. 2a. Like described earlier with respect to FIG. 2a, the request 2-16 is optional since the device 2-4 may provide the parameter value on its own motion (for example at fixed time points or periods).

Like described in FIG. 2a the network entity 2-3 or the client 2-1 may enable access to the parameter value of the device 2-4 in the steps 2-17 and/or 2-24.

After receiving the parameter (odometer) value in step 2-18 from the device 2-4, and the authentication value from the client in step 2-20 (forwarded by the secured object 2-2 which receives the authentication value in step 2-29 from the client 2-1), the network entity 2-3 performs the authentication of the client in step 2-21. The same considerations with respect to the authentication step 2-21 as mentioned related to this step in FIG. 2a apply also here.

In step 2-30 network entity 2-3 reports the result of the authentication process to the secured object 2-2, for example in the form of an authentication information (for example authentication success or fail). The secured object 2-2 may then, based on the received authentication indication 2-30, allow or refuse access to the secured object and/or information (not shown).

In FIGS. 2a and 2b the communication between the secured object 2-2 and the network entity 2-3, and the communication between the network entity 2-3 and the device 2-4, is preferably done via secured connections and/or in an encrypted manner to ensure privacy and confidentiality of the transferred information. Therefore, the involved devices/entities may establish trust, and a trusted connection, between each other beforehand.

Figure 2C:
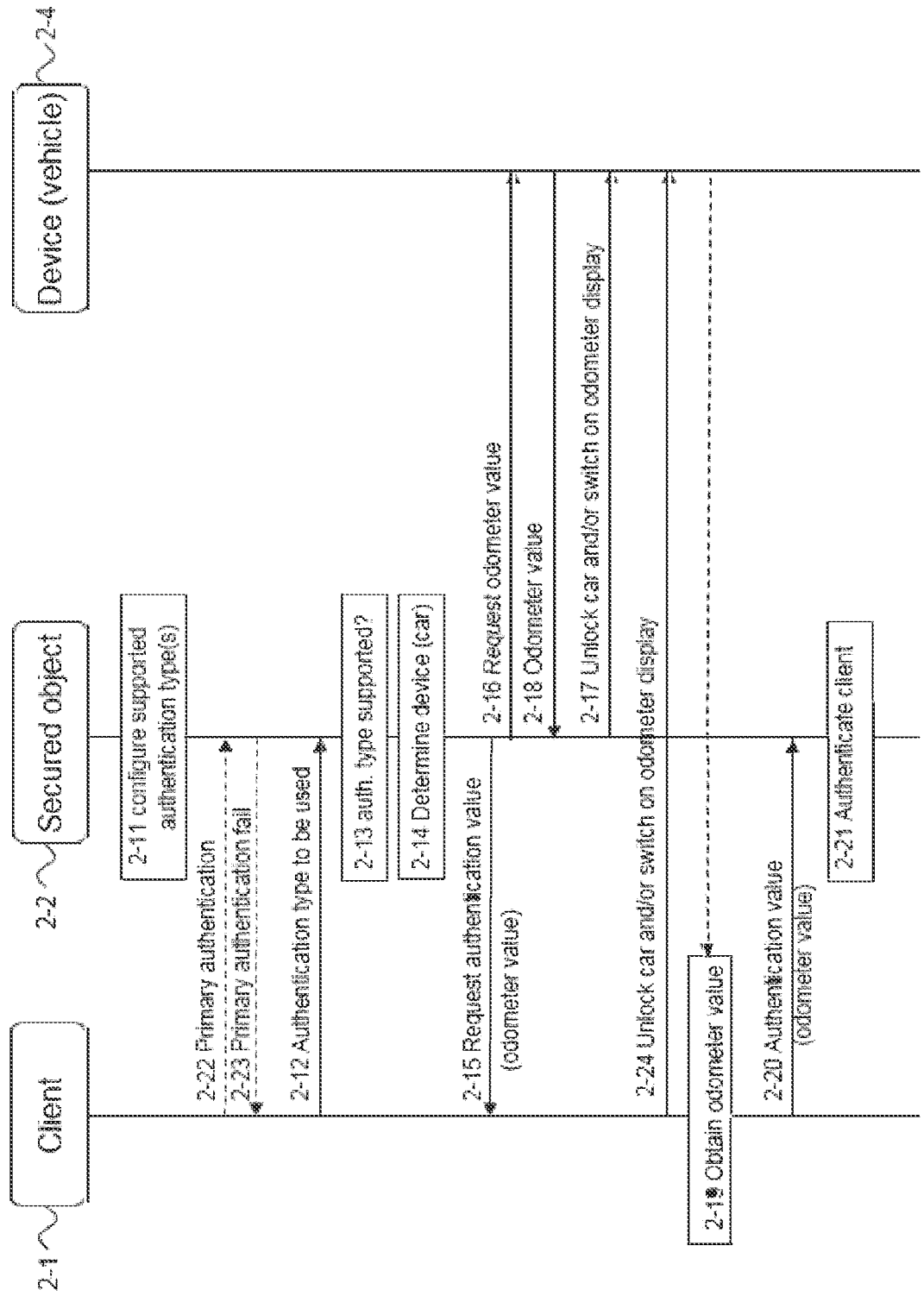
FIG. 2c illustrates an example embodiment of a message flow diagram with respect to the example embodiment shown in FIG. 1c.

FIG. 2c shows another example embodiment of a message flow diagram related to FIG. 1c. The main difference compared to FIG. 2a is that no network entity 2-3 is involved in the authentication process. Instead the secured object 2-2 communicates with the device 2-4 directly. This communication may be done via a wired or wireless connection (for example via a cellular connection, or via WLAN/WiFi or Bluetooth). Thus mainly steps related to the communication with the device 2-4 are changed compared to the steps shown in FIG. 2a. Other steps, like for example steps 2-11, 2-22, 2-23, 2-12, 2-13, 2-14, 2-15, 2-24, 2-19, 2-20, and 2-21 are corresponding to those steps of FIG. 2a and are therefore not described in detail with respect to FIG. 2c anymore.

After the secured object 2-2 has determined the device 2-4, and optionally also the parameter to request from the device, it may request the parameter (here odometer) value from the device in step 2-16. As explained for the corresponding step in FIG. 2a this request in optional. Alternatively, the device may report the parameter value on its own motion, for example at fixed time point(s) or periodically, without the request in step 2-16.

In optional step 2-17 the secured object 2-2 may enable access to the device 2-4 and/or the requested parameter. The device returns then the parameter in step 2-18, which may be done in response to the request, at fixed time point(s) or periodically.

After the parameter value (in the embodiment the odometer value) has been received by the secured object 2-2 in step 2-18 and the authentication value has been received from the client 2-1 in step 2-20, the secured object 2-2 performs the authentication in step 2-21 as described in relation to FIG. 2a.

In FIG. 2c the communication between the secured object 2-2 and the device 2-4 may be done via a wireless connection (for example a cellular connection, via WLAN/WiFi or via Bluetooth). Preferably the connection will be a secured connections and/or may be done in an encrypted manner to ensure for example the privacy and confidentiality of the transferred information. Therefore, the involved devices/entities may establish trust, and a trusted connection, between each other beforehand.

Figure 3:
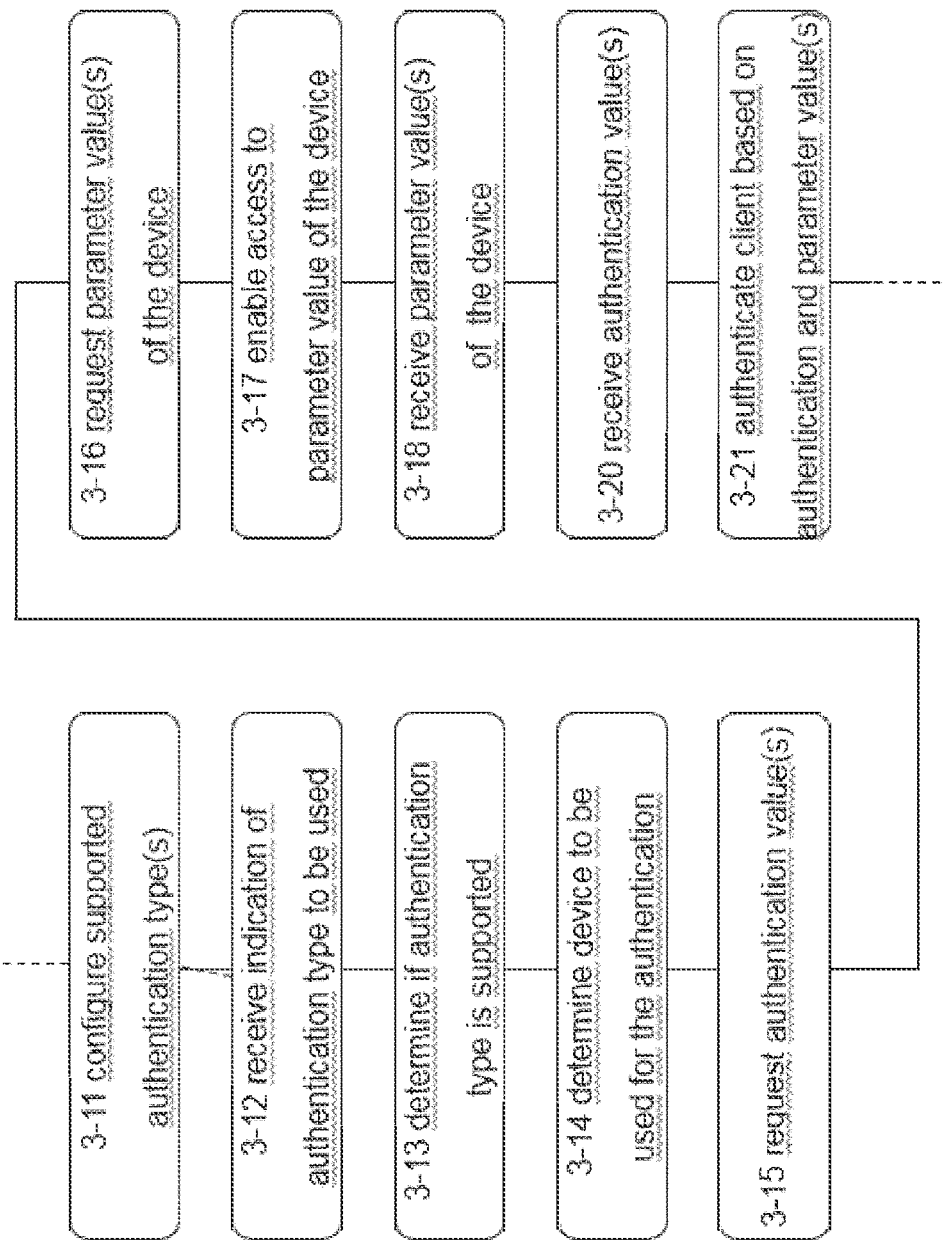
FIG. 3 shows an example embodiment of a method for authenticating a client.

FIG. 3 shows an example embodiment of a method for authenticating a client, which may be performed with respect to the scenarios described with respect to the embodiments of FIGS. 1a to 1c and 2a to 2c, but is not limited to those.

In optional step 3-11 one or more supported authentication type(s) may be configured, optionally comprising also the parameter to be used for the authentication. If more than one authentication type, or one authentication type with various devices or parameters to be used, is configured to be supported, a priority order for those may be configured. The priority order can be used to challenge the client for an authentication value of a certain authentication type and/or device or parameter based on the priority. Alternatively, the authentication type to be used can be also selected in a random manner.

In optional step 3-12 an indication of the authentication type to be used may be received. This indication may be received for example from a client as shown in FIGS. 2a to 2c. Alternatively (not shown) the authentication type, and/or device or parameter may be selected in a prioritized or random manner from the supported authentication types. Optionally more than one authentication type may be used for the authentication and therefore also one or more indications of more than one authentication type to be used may be received or selected.

In step 3-13 it may be determined if the authentication type (for example the one or more authentication type(s) received in step 3-12) is supported. This step is optional since alternative the authentication may be also selected from the supported authentication types as described above.

In step 3-14 a device to be used for the authentication of the client is determined. The device may be determined based on the selected or received authentication type. In addition to the device a parameter to be used for the authentication may be determined. In a variation more than one parameter may be determined to be used for the authentication (for example if the authentication is based on 2 different parameter values which may be combined to one value, like for example odometer value+fuel level, or may be used as 2 separate parameter/authentication values in the authentication process).

In step 3-15 an authentication value may be requested, for example from the client directly via a keypad or a touchscreen or via a different device or entity (for example via a tablet or smart phone of the client). Step 3-15 is optional, since the client may provide the authentication value on its own motion, for example together with the indication of the authentication type to be used in step 3-12, or as a dedicated separate action (for example the providing of the authentication value via a touchscreen/keypad may trigger the whole authentication process, which means that the authentication process is already aware about the authentication value and does not need to request it anymore). Optionally more than one authentication value may be requested or provided by the client.

In optional step 3-16 a parameter value of the device may be requested. The request may comprise an indication of the parameter, for example if more than one parameter of the device is supported for authentication. However, the request may also comprise the parameter if only one parameter is supported. The request may be directed directly to the device or to an intermediate entity which may forward the request to the device. Alternatively, an intermediate entity may retrieve the requested parameter value from an own or external database, or the request may be directed to a database able to provide the value. Step 3-16 is optional, since in an alternative implementation the parameter value may be reported without requesting it, for example at fixed time point(s) or periodically. The reporting at fixed time point(s) or periodically may be pre-configured (for example in the device or another entity or database) or may have been initially requested earlier. Optionally more than one parameter value may be requested.

Optionally access to the one or more parameter values of the device may be enabled in step 3-17. This may be done if access to the parameter value (or the device providing the parameter value) may not be directly possible for the client (for example access to a locked device, or access to a parameter value which is normally not accessible/displayed or readable). Step 3-17 may enable also the possibility to access the parameter value wirelessly, for example via a smart phone, a tablet or laptop. Since the client may also gain access to a parameter value by himself (for example in case when the parameter value is the odometer value of his car) step 3-17 is optional.

In step 3-18 the (one or more) parameter value of the device is received. This may happen based on the optional request of step 3-16 or automatically (for example at fixed time point(s) or periodically). The one or more parameter value may be received from the device directly, from some intermediate network element or from a database which may collect information comprising the parameter value (for example in case of the odometer value of a car from a database of the car manufacturer collecting information from car). A time stamp for the parameter value and an accuracy indication (for example when a parameter value constantly changes) may be received together with the parameter value. Those may be used later during the authentication step 3-21.

In step 3-20 an authentication value of the client is received. This may be done based on the optional request in step 3-15 or without any request (for example if the client enters the authentication value in a keypad, which may then trigger the authentication process). Optionally more than one authentication value is received.

In step 3-21 the client is authenticated based on the authentication value received in step 3-20 and the parameter value received in step 3-18. The authentication may be successful if a match between the authentication value and the parameter value is detected, or if the difference between the authentication value and the parameter value is in a certain range.

The range may be received together with the parameter value in step 3-18 or may be pre-configured. Alternatively, the range may be also calculated based on time and/or accuracy information which may be received together with the parameter value. The accuracy information may be a fixed range, or a range which may vary based on the time elapsed after the parameter value was collected (the time elapsed since the time stamp of the parameter value). If more than one parameter value may be used for the authentication of a client, it may be required that all of them match or are in a certain range compared to the provided authentication values to successfully authenticate the client, or that a defined subset match (for example at least 3 out of 4, or 80%, of the used values).

If the authentication of the client was successful, the client may be granted access to the object or information where access is desired to (not shown). If the authentication is not successful the client may be informed and the authentication process may be repeated, possible with an alternative authentication type or device or parameter.

The steps described in connection to FIG. 3 may be also carried out in a different order then shown in FIG. 3 and described above. Therefore, the order of those steps is not limiting.

Figure 4:
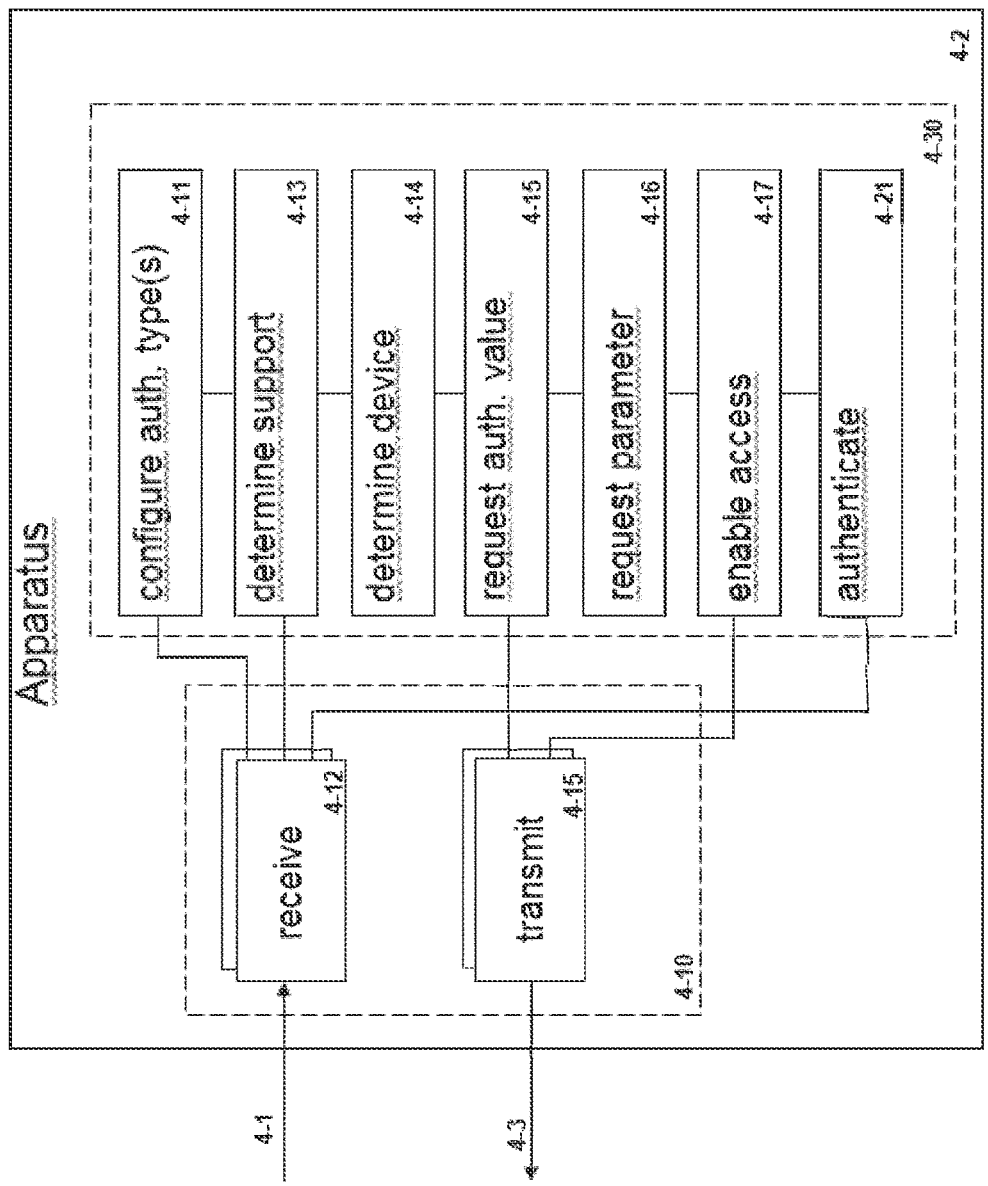
FIG. 4 illustrates an example embodiment of an apparatus authenticating a client.

FIG. 4 shows an example embodiment of an apparatus 4-2 for authenticating a client adapted to perform a method as shown in FIG. 3. The apparatus may be for example the secured object 1-2 of FIG. 1a, 1c, or the secured object 2-2 of FIGS. 2a and 2c or the network entity 1-3 of FIG. 1b or the network entity 2-3 of FIG. 2b.

The apparatus 4-2 comprises one or more a receive modules 4-12, which receive (4-1) a parameter value (as shown in step 3-18 of FIG. 3 and in step 2-18 of FIGS. 2a, 2b and 2c) and an authentication value (as shown in step 3-20 of FIG. 3 and in step 2-20 of FIGS. 2a, 2b and 2c). Optionally the receive module may further receive an indication of an authentication type to be used (as shown in step 3-12 of FIG. 3 and in step 2-12 of FIGS. 2a, 2b and 2c). Further the configuration of the supported authentication type (as shown in step 3-11 of FIG. 3) may be received via the receive module 4-12 as well.

The apparatus 4-2 may further comprises one or more transmit modules 4-15, which may transmit (4-3) a request for an authentication value (as shown in step 3-15 of FIG. 3 and in step 2-15 if FIGS. 2a, 2b and 2c). The transmit module may further transmit a request for a parameter value of a device (as shown in step 3-16 of FIG. 3 and step 2-16 of FIGS. 2a, 2b and 2c) and information to enable access to a parameter value of a device (as shown in step 3-17 of FIG. 3 and step 2-17 of FIGS. 2a, 2b and 2c).

The one or more receive modules 4-12 and the one or more transmit modules 4-15 of the apparatus 4-2 may be combined in a one or more transceiver module 4-10.

Further the apparatus may comprise a configuration module 4-11 for configuring supported authentication type(s) (as shown in step 3-11 of FIG. 3 and step 2-11 of FIGS. 2a, 2b and 2c). As mentioned above the configuration information may be received via the receive module 4-12.

The apparatus may comprise a determination module 4-13 for determining if an authentication type is supported (as shown in step 3-13 of FIG. 3 and step 2-13 of FIGS. 2a, 2b and 2c).

Still further the apparatus comprises a determination module 4-14 for determining a device and/or a parameter to be used for authentication of a client (as shown in step 3-14 of FIG. 3 and step 2-14 of FIGS. 2a, 2b and 2c).

The optional request module 4-15 of the apparatus 4-2 may request one or more authentication value, for example from a client (as shown in step 3-15 of FIG. 3 and step 2-15 of FIGS. 2a, 2b and 2c).

The optional request module 4-16 of the apparatus 4-2 may request one or more parameter value of a device (as shown in step 3-16 of FIG. 3 and step 2-16 of FIGS. 2a, 2b and 2c).

The apparatus may further comprise an enable access module 4-17 for enabling access to a parameter value of a device (as shown in step 3-17 of FIG. 3 and step 2-17 of FIGS. 2a, 2b and 2c). Optionally access to more than one parameter value may be enabled.

The apparatus further comprises an authentication module 4-21 for authenticating a client based on the received one or more authentication value and the received one or more parameter value (as shown in step 3-21 of FIG. 3 and step 2-21 of FIGS. 2a, 2b and 2c).

Modules 4-11, 4-13, 4-14, 4-15, 4-16, 4-17, and 4-21 may be implemented (4-30) in HW, in SW executed by one or more processors, or in a combination of both.

The above modules of FIG. 4 are adapted to perform the functionality described with respect to the referred steps in FIGS. 2a, 2b, 2c and 3.

Figure 5:
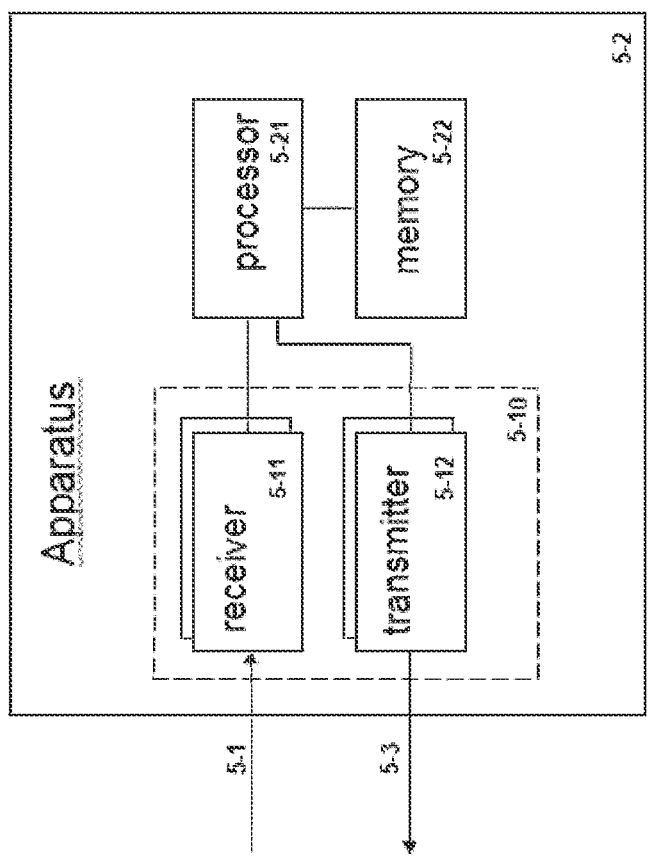
FIG. 5 illustrates another example embodiment of an apparatus authenticating a client.

FIG. 5 is an example block diagram of apparatus 5-2 for authenticating a client. Apparatus 5-2 is adapted to perform a method as shown in FIG. 3. The apparatus may be for example the secured object 1-2 of FIG. 1a, 1c, the secured object 2-2 of FIGS. 2a and 2c, the network entity 1-3 or FIG. 1b or the network entity 2-3 of FIG. 2b. The apparatus may be a mobile device (like a mobile phone, a smart phone, a PDA or a portable computer (e.g., laptop, 6 tablet)); a server (for example a server of a vehicle manufacturer which may collect vehicle information or a smart home server) or a network entity (for example a network control entity like an authentication or authorization server).

The apparatus may comprise an interface 5-10, a processor 5-21, and a memory 5-22. The interface 5-10 may further comprise one or more receiver 5-11 and one or more transmitter 5-12. The receiver 5-11 and the transmitter 5-12 may be combined in a transceiver 5-10. The receiver may receive signals 5-1 and the transmitter may transmit signals 5-3 from and to the apparatus 5-2. Signals may be received and transmitted wirelessly (e.g., via an antenna which is not shown). Processor 5-21 may execute instructions to provide some or all the functionality described above as being provided by the secured object, the network entity, or the apparatus 4-2. Memory 5-22 may store instructions executed by processor 5-21, for example instructions to perform a method as described in FIG. 3.

Processor 5-21 may comprise any suitable combination of hardware and software implemented in one or more modules to execute instructions and manipulate information/data to perform some or all the described functions with respect to the method shown and described with respect to FIG. 3 and apparatus 4-2 (for example the secured object or the network entity). In some embodiments, processor 5-21 may comprise one or more computers, one or more central processing units (CPUs), one or more microprocessors, one or more applications, and/or other logic.

Memory 5-22 may be generally operable to store instructions, such as a computer program, software, an application comprising one or more of logic, rules, algorithms, code, tables, etc. and/or other instructions capable of being executed by a processor. Examples of memory 5-22 may comprise computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Alternative embodiments of the apparatus 4-2 and 5-2 may comprise additional components beyond those shown in FIG. 4 or 5. Those additional components may provide certain aspects of the functionality, including any of the functionality described herein and/or any additional functionality (including any functionality necessary to support the solution described herein).

Various types of elements may comprise components having the same physical hardware but may be configured (e.g., via programming) to support different radio access technologies, or may represent partly or entirely different physical components.

Some embodiments of the disclosure may provide one or more technical advantages. Some embodiments may benefit from some, none, or all these advantages. Other technical advantages may be readily ascertained by one of ordinary skill in the art.

In a first aspect an example embodiment of a method for authenticating a client is provided.

The method comprises determining a device to be used for authentication of the client. The method further comprises receiving a parameter value of the device and receiving an authentication value of the client. Further the method comprises authenticating the client based on the authentication value and the parameter value.

Refinements of the method according to the first aspect may comprise one or more of:
 wherein determining a device to be used for the authentication may further comprise to determine a parameter of the device to be used for the authentication;
 receiving an indication of an authentication type to be used, wherein the determining of the device may be based on the authentication type;
 configuring one or more supported authentication types;
 determining if the authentication type is supported, and if the authentication type is not supported aborting the authentication;
 requesting the parameter value of the device;
 wherein the parameter value may be a value which is variable;
 wherein the device may comprise a counter and wherein the parameter value may comprise the counter value;
 wherein the device may comprise a level indicator and wherein the parameter value may comprise the indicated level;
 wherein the parameter value may comprise a position of the device;
 enabling access to the parameter value of the device;
 wherein enabling access to the parameter value of the device may comprise at least one of unlocking the device or enabling the device to provide the parameter value;
 wherein the authentication type may be one of an authentication via vehicle and an authentication via smart meter and an authentication via wearable smart device;
 wherein the authentication type may comprise at least one of an identifier of the device and a parameter of the device;
 wherein the client may be successfully authenticated if one of the following criteria applies:
  the authentication value and the parameter value are equal;
  the authentication value is within a defined range from the parameter value; and
  a defined number of most significant bits or digits of the authentication value and the parameter value are equal;
 receiving with the parameter value at least one of a time stamp of the parameter value and a range indication of the parameter value and a validity time indication of the parameter value;
 requesting the authentication value from the client; and
 wherein the device may comprise one of a vehicle and a smart meter and a wearable smart device.

In an second aspect an example embodiment of a computer program is provided. The computer program comprising program code to be executed by at least one processor of an apparatus wherein the execution of the program code causes the at least one processor to execute a method according to the first aspect.

Refinements of the computer program according to the second aspect may be according to the one or more refinements of the method according to the first aspect or one or more of:
 the computer program may be a computer program product;
 the computer program may comprise a non-transitory computer readable storage medium storing the program code.

In a third aspect an example embodiment of an apparatus for authenticating a client is provided. The apparatus is adapted to perform to determine a device to be used for authentication of the client. The apparatus is further adapted to perform to receive a parameter value of the device and an authentication value of the client. The apparatus is still further adapted to perform to authenticate the client based on the authentication value and the parameter value.

In a fourth aspect an example embodiment of an apparatus for authenticating a client is provided. The apparatus comprises a first module configured to determine a device to be used for authentication of the client. The apparatus further comprises a second module configured to receive a parameter value of the device and a third module to receive an authentication value of the client. Still further the apparatus comprises a fourth module to authenticate the client based on the authentication value and the parameter value. The second and the third module may be combined into one module.

In a fifth aspect an example embodiment of an apparatus for authenticating a client is provided. The apparatus comprises at least one processor. The apparatus further comprises a memory, the memory containing a program comprising instructions executable by the at least one processor. The at least one processor is configured to determine a device to be used for authentication of the client and to receive a parameter value of the device. The at least one processor is further configured to receive an authentication value of the client and to authenticate the client based on the authentication value and the parameter value.

Refinements of the apparatus according to the third, fourth or fifth aspect may be according to one or more refinements of the method according to the first aspect.

Further the apparatus may comprise one of a secured object, an authentication server and a smart home server and a mobile device.

It is to be understood that the examples and embodiments as explained above are merely illustrative and susceptible to various modifications. For example, the concepts could be used in other types of communication networks, not explicitly mentioned so far. Further, it is to be understood that the above concepts may be implemented by using correspondingly designed software in existing nodes, or by using dedicated hardware in the nodes.

Abbreviations

CD Compact Disk
DVD Digital Video Disk
HW Hardware
IoT Internet of Things
MTC Machine Type Communication
PIN Personal Identification Number
PDA Personal Digital Assistant
RAM Random Access Memory
ROM Read Only Memory
RX Receiver
SMS Short Message Service
SW Software
TX Transmitter
WiFi any kind of WLAN network, synonym to WLAN
WLAN Wireless Local Area Network

The invention claimed is:

1. A method by at least one authentication hardware processor of an apparatus for authenticating a user, the method comprising:
   determining a device to be used for authentication of the user;
   receiving a parameter value of the device;
   receiving an authentication value entered by the user;
   authenticating the user based on the authentication value entered by the user and the parameter value obtained from the determined device, wherein:
      the determining of the device to be used for authentication of the user, comprises determining an odometer value of a vehicle is to be used for authentication of the user;
      the receiving of the parameter value of the device, comprises obtaining from the vehicle a vehicle-supplied odometer value for the vehicle;
      the receiving of the authentication value entered by the user, comprises receiving from the user a user-entered odometer value of the vehicle; and
      the authenticating of the user based on the authentication value and the parameter value, comprises authenticating the user based on comparison of the user-entered odometer value and the vehicle-supplied odometer value; and
   enabling access to a secured object based on successful authentication of the user.

2. The method of claim 1, the method further comprising: enabling access to the parameter value of the vehicle.

3. The method of claim 1, wherein the determining of the device to be used for authentication of the user further comprises receiving from the user an identifier associated with the vehicle.

4. The method of claim 1, wherein the user is successfully authenticated based on one of the following criteria being satisfied,
   the authentication value and the parameter value are equal,
   the authentication value is within a defined range from the parameter value, and
   a defined number of most significant bits or digits of the authentication value and the parameter value are equal.

5. The method of claim 1, the method further comprising receiving with the parameter value at least one of a time stamp of the parameter value and a range indication of the parameter value and a validity time indication of the parameter value.

6. A method by at least one authentication hardware processor of an apparatus for authenticating a user, the method comprising:
   determining a device to be used for authentication of a user;
   receiving a parameter value of the device;
   receiving an authentication value entered by the user;
   authenticating the user based on the authentication value entered by the user and the parameter value obtained from the determined device, wherein:
      the determining of the device to be used for authentication of the user, comprises determining a measured value of a utility meter is to be used for authentication of the user;
      the receiving of the parameter value of the device, comprises obtaining from the utility meter a utility meter-supplied measured value;
      the receiving of the authentication value entered by the user, comprises receiving from the user a user-entered measured value of the utility meter; and
      the authenticating of the user based on the authentication value and the parameter value, comprises authenticating the user based on comparison of the user-entered measured value of the utility meter and the utility meter-supplied measured value; and
   enabling access to a secured object based on successful authentication of the user.

7. The method of claim 6, wherein the determining of the device to be used for authentication of the user further comprises receiving from the user an identifier associated with the utility meter.

8. The method of claim 6, wherein the user is successfully authenticated based on one of the following criteria being satisfied,
   the authentication value and the parameter value are equal,
   the authentication value is within a defined range from the parameter value, and
   a defined number of most significant bits or digits of the authentication value and the parameter value are equal.

9. The method of claim 6, the method further comprising receiving with the parameter value at least one of a time stamp of the parameter value and a range indication of the parameter value and a validity time indication of the parameter value.

10. An apparatus for authenticating a user, the apparatus comprising:

at least one authentication hardware processor; and
at least one memory coupled with the at least one authentication hardware processor, wherein the at least one memory stores instructions executable by the at least one authentication hardware processor to,
  determine a device to be used for authentication,
  receive a parameter value of the device,
  receive an authentication value entered by the user,
  authenticate the user based on the authentication value entered by the user and the parameter value obtained from the determined device, wherein:
    the determining of the device to be used for authentication of the user, comprises determining a steps value counted by a mobile device is to be used for authentication of the user;
    the receiving of the parameter value of the device, comprises obtaining from the mobile device the steps value counted by the mobile device;
    the receiving of the authentication value entered by the user, comprises receiving from the user a user-entered steps value of the mobile device; and
    the authenticating of the user based on the authentication value and the parameter value, comprises authenticating the user based on comparison of the user-entered steps value of the mobile device and the steps value counted by the mobile device; and
  enable access to a secured object based on successful authentication of the user.

11. The apparatus of claim 10, wherein the determining of the device to be used for authentication of the user further comprises receiving from the user an identifier associated with the mobile device.

12. The apparatus of claim 10, wherein the user is successfully authenticated based on one of the following criteria being satisfied,
  the authentication value and the parameter value are equal,
  the authentication value is within a defined range from the parameter value, and
  a defined number of most significant bits or digits of the authentication value and the parameter value are equal.

13. The apparatus of claim 10, wherein the instructions executable by the at least one authentication hardware processor further comprise receiving with the parameter value at least one of a time stamp of the parameter value and a range indication of the parameter value and a validity time indication of the parameter value.

14. An apparatus for authenticating a user, the apparatus comprising:
  at least one authentication hardware processor; and
  at least one memory coupled with the at least one authentication hardware processor, wherein the at least one memory stores instructions executable by the at least one authentication hardware processor to,
    determine a device to be used for authentication of the user;
    receive a parameter value of the device;
    receive an authentication value entered by the user;
    authenticate the user based on the authentication value entered by the user and the parameter value obtained from the determined device, wherein:
      the determining of the device to be used for authentication of the user, comprises determining an odometer value of a vehicle is to be used for authentication of the user;
      the receiving of the parameter value of the device, comprises obtaining from the vehicle a vehicle-supplied odometer value for the vehicle;
      the receiving of the authentication value entered by the user, comprises receiving from the user a user-entered odometer value of the vehicle; and
      the authenticating of the user based on the authentication value and the parameter value, comprises authenticating the user based on comparison of the user-entered odometer value and the vehicle-supplied odometer value; and
    enable access to a secured object based on successful authentication of the user.

15. The apparatus of claim 14, wherein the instructions executable by the at least one authentication hardware processor further comprise enabling access to the parameter value of the vehicle.

16. The apparatus of claim 14, wherein the determining of the device to be used for authentication of the user further comprises receiving from the user an identifier associated with the vehicle.

17. The apparatus of claim 14, wherein the user is successfully authenticated based on one of the following criteria being satisfied,
  the authentication value and the parameter value are equal,
  the authentication value is within a defined range from the parameter value, and
  a defined number of most significant bits or digits of the authentication value and the parameter value are equal.

18. The apparatus of claim 14, wherein the instructions executable by the at least one authentication hardware processor further comprise receiving with the parameter value at least one of a time stamp of the parameter value and a range indication of the parameter value and a validity time indication of the parameter value.

19. An apparatus for authenticating a user, the apparatus comprising:
  at least one authentication hardware processor; and
  at least one memory coupled with the at least one authentication hardware processor, wherein the at least one memory stores instructions executable by the at least one authentication hardware processor to,
    determine a device to be used for authentication of a user;
    receive a parameter value of the device;
    receive an authentication value entered by the user;
    authenticate the user based on the authentication value entered by the user and the parameter value obtained from the determined device, wherein:
      the determining of the device to be used for authentication of the user, comprises determining a measured value of a utility meter is to be used for authentication of the user;
      the receiving of the parameter value of the device, comprises obtaining from the utility meter a utility meter-supplied measured value;
      the receiving of the authentication value entered by the user, comprises receiving from the user a user-entered measured value of the utility meter; and
      the authenticating of the user based on the authentication value and the parameter value, comprises authenticating the user based on comparison of the user-entered measured value of the utility meter and the utility meter-supplied measured value; and enable access to a secured object based on successful authentication of the user.

20. The apparatus of claim 19, wherein the determining of the device to be used for authentication of the user further comprises receiving from the user an identifier associated with the utility meter.

21. The apparatus of claim 19, wherein the user is successfully authenticated based on one of the following criteria being satisfied,
   the authentication value and the parameter value are equal,
   the authentication value is within a defined range from the parameter value, and
   a defined number of most significant bits or digits of the authentication value and the parameter value are equal.

22. The apparatus of claim 19, wherein the instructions executable by the at least one authentication hardware processor further comprise receiving with the parameter value at least one of a time stamp of the parameter value and a range indication of the parameter value and a validity time indication of the parameter value.

23. A method by at least one authentication hardware processor of an apparatus for authenticating a user, the method comprising:
   determining a device to be used for authentication,
   receiving a parameter value of the device,
   receiving an authentication value entered by the user,
   authenticating the user based on the authentication value entered by the user and the parameter value obtained from the determined device, wherein:
      the determining of the device to be used for authentication of the user, comprises determining a steps value counted by a mobile device is to be used for authentication of the user;
      the receiving of the parameter value of the device, comprises obtaining from the mobile device the steps value counted by the mobile device;
      the receiving of the authentication value entered by the user, comprises receiving from the user a user-entered steps value of the mobile device; and
      the authenticating of the user based on the authentication value and the parameter value, comprises authenticating the user based on comparison of the user-entered steps value of the mobile device and the steps value counted by the mobile device, and
   enabling access to a secured object based on successful authentication of the user.

24. The method of claim 23, wherein the determining of the device to be used for authentication of the user further comprises receiving from the user an identifier associated with the mobile device.

25. The method of claim 23, wherein the user is successfully authenticated based on one of the following criteria being satisfied,
   the authentication value and the parameter value are equal,
   the authentication value is within a defined range from the parameter value, and
   a defined number of most significant bits or digits of the authentication value and the parameter value are equal.

26. The method of claim 23, further comprising receiving with the parameter value at least one of a time stamp of the parameter value and a range indication of the parameter value and a validity time indication of the parameter value.

* * * * *